Patented June 23, 1942

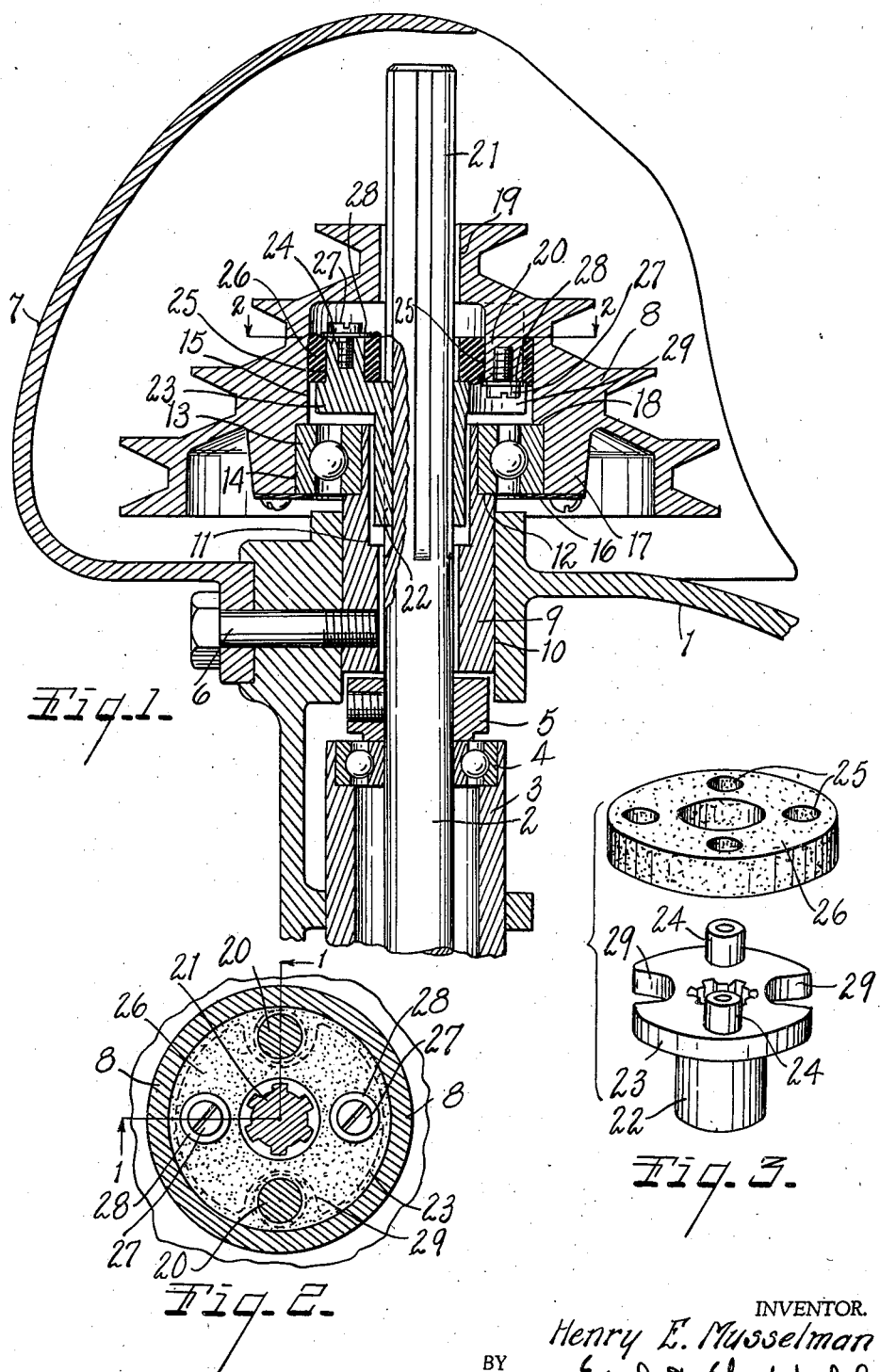

2,287,391

UNITED STATES PATENT OFFICE 2,287,391

DRILL PRESS

Henry E. Musselman, Kalamazoo, Mich., assignor to Atlas Press Company, Kalamazoo, Mich.

Application March 28, 1941, Serial No. 385,641

14 Claims. (Cl. 77—5)

This invention relates to improvements in drill press.

The main objects of this invention are:

First, to provide an improved power transmission for inexpensive pulley driven drill presses whereby torque is effectively transmitted from the pulley to the drill spindle notwithstanding misalignment, and wherein undue wear and noise are eliminated.

Second, to provide an assembly of the type described for a pulley driven press including coaxial rotatable driving and driven members of the press and a flexible coupling transmitting torque therebetween without loose or sloppy fits or the objectionable wear and noise characterising such expedients; and likewise without requiring special axial restraining provisions for preventing axial displacement of the driving member pulley and the spindle actuating member driven thereby, which provisions are also the source of wear and noise in operation and add to the over-all length and to the cost of assembly.

Third, to provide a power transmission of the type described for inexpensive drill presses and the like, which is exceedingly compact in character, the parts being telescoped axially to a considerable degree to reduce the axial length, and which is relatively simple and inexpensive in its parts and the assembly thereof.

Further objects and advantages pertaining to details and economies of construction and operation will appear from the description to follow. The invention is defined in the claims. A preferred embodiment of my invention is illustrated in the accompanying drawing, wherein:

Fig. 1 is a fragmentary view in section on an angular line corresponding to line 1—1 of Fig. 2, illustrating structural details and relationships of the assembly of my invention.

Fig. 2 is a fragmentary view in section on line 2—2 of Fig. 1, taken through the pulley of Fig. 1 and showing the flexible coupling.

Fig. 3 is a bracketed perspective view illustrating the spindle driving element and the flexible elastic coupling element or cushion therefor as embodied in my assembly.

This invention relates to improvements in an inexpensive type of pulley-driven drill press and more particularly to the torque transmission assembly associated with the pulley and spindle thereof, which is of greatly increased silence and effectiveness in operation. It will be appreciated that in such low cost machine tools it is impractical from a cost standpoint to machine the parts to the exceedingly close tolerances requisite for the desired quiet operation. It is therefore necessary in an inexpensive structure of this type to provide a relatively inexpensive, readily installed driving or torque connection between the driving pulley and the tool spindle, which will absorb or accommodate misalignment, for this is ordinarily the source of most of the vibration, noise and wear in such structures. Heretofore it has been proposed to employ a loose or sloppy driving fit between the pulley and a spindle-connected element driven thereby; however, this expedient is open to the objection that the undesirable and excessive wear and noise are multiplied. Moreover, in such structures it is necessary to provide additional special means to restrain the parts from axial separation which not only adds to the axial length of the installation, it also introduces still further frictional wearing engagements between moving and stationary parts. Thus the rotatable pulley driven part of the joint tends to align itself and find an axial seat on a fixed part, and thereby impairs its function and adds to the general wear and noise of operation, so as to necessitate replacement after prolonged use.

It is therefore the general object of the present invention to provide a torque transmission coupling between a driving pulley and a driven spindle which is compact in nature, which functions silently without play or looseness and without a multiplicity of parts having no function in the actual transmission of power, the coupling absorbing pulley vibration before it reaches the spindle, and being strong and rugged in construction, so as to provide a permanent silent joint requiring no attention during the life thereof following installation.

Referring to the drawing, the reference numeral 1 indicates the vertically adjustable tool supporting head of a conventional low-cost drill press wherein the spindle 2, splined at its upper end at 21 and bearing at its lower end the tool chuck (not shown), is rotatably received. The head has the vertically adjustable hollow spindle guide quill 3 slidably adjustable therein, in which quill spindle 2 is rotatably journaled by ball bearings 4. Suitable collar means 5 secured to the spindle provides for the elevation and lowering thereof with quill 3 in a known manner.

Secured to the upper end of the frame as by a bolt 6 is a cast pulley guard 7 enclosing the upper end of the spindle and the actuating cone pulley 8 therefor, the said pulley being rotatably actuated by a belt drive (not shown) in a well known manner.

A guard securing bolt 6 serves to threadedly engage and secure a hollow elongated pulley bearing sleeve 9 arranged concentrically of spindle 2 in a vertically extending circular bore 10 of the machine head 1. Sleeve 9 has substantial lateral clearance relative to the spindle and is axially counterbored at its upper end as indicated by the reference numeral 11 for a purpose to be described. This sleeve serves as a support for the pulley 8, being reduced in diameter at its upper end to provide an annular seat or shoulder 12 on which the inner race of the ball bearing 13 for the pulley is supported. This may be a mild driven fit, though it is only necessary to insure against lateral play or vibration at this point. The outer race of bearing 13 is similarly received in the counterbored lower extremity 14 of a central bore or recess 15 of substantial size interiorly of the pulley. This latter recess houses the flexible driving connections to be described, likewise the bearing itself, so that a reduction in axial dimension is effected.

An annular keeper plate 16 screwed onto the lower extremity of a hollow annular boss 17 interiorly of the pulley serves to hold bearing 13 in assembled position in case the fit of the latter in the recess requires this. The pulley is supported on the said outer race by the shoulder 18 of its counterbored interior.

It will be noted that the axial opening 19 at the top of pulley through which the splined end 21 of the spindle extends has substantial lateral clearance relative to the said spindle to accommodate its lateral movement under the transverse belt pull exerted thereon in operation.

Interiorly of the recess 15 in pulley 8, the latter is provided with a pair of diametrically opposed, downwardly projecting torque transmission or driving lugs 20. Likewise the spindle 2 has splined on the upper end thereof a sleeve-like driven spindle rotating member 22 which for convenience I designate a quill, this member being provided on its upper end with an enlargement 23 bearing a pair of diametrically opposed upwardly extending driven lugs 24. It will be noted that these lugs are on the top extremity of quill 22, also that the axially extending splined driving portion of the quill 22 is telescoped substantially in and has substantial lateral clearance interiorly of the counterbore of sleeve 9. Thus the axial dimension is compacted further and there is no engagement of the sleeve and quill 22 under the aforesaid lateral belt pull. The splined driving connection of quill 22 to the spindle is one permitting free relative axial or sliding movement of the parts, without substantial friction impeding the same; however, there is no looseness or sloppiness at this point.

Torque transmission lugs 20, 24 on the pulley and quill 22 respectively extend in opposite directions in pulley recess 15 and are arranged at 90° angularly relative to one another. These lugs are disposed in the equally spaced openings 25 of a circular torque transmitting cushioning element 26, which is also centrally apertured to receive the splined end 21 of the spindle with substantial lateral clearance. Element 26 is disk-like in character and is fabricated of any suitable elastic compressible material such as rubber or a synthetic rubber substitute. It has a snug peripheral fit in the annular bore 15 of the pulley, being preferably compressed somewhat by its engagement therein so as to normally maintain the pulley in exact concentric relation to the spindle and sleeve 22, without looseness, play, or sloppiness; however, the element 25 is readily compressible slightly to accommodate and compensate for lateral belt pull. The respective opposed driving and driven lugs 20, 24 of the pulley and sleeve 22 have a close fit in the 90° staggered recesses 25 of the cushioning element, so as to effectively and silently transmit and receive driving torque through the latter. This cushion completely absorbs pulley vibration before it reaches the quill 22 and spindle.

To fasten the foregoing coupling parts together, I provide the headed screws 27 and washers 28 coacting with the said lugs 20, 24 and radially overhanging the elastic cushioning member. The material of the cushion element 26 is preferably slightly thicker than the lugs 20, 24 are long, so that washers compress the material in engaging the ends of the lugs. The enlarged portion 23 of the sleeve or quill 22 is cut away at 29 to receive the heads of these screws so that there is no possibility of clashing of rigid mechanical parts.

Alternatively, the lugs might be attached to the cushion in any other suitable manner consistent with the operating features to be described; however, the foregoing constitutes an assembly of great compactness, inasmuch as the pulley bearing and all of the flexible, misalignment compensating provisions are compactly housed and automatically centered at all times within the cone pulley 8. Particular attention is directed to the fact that the connection of cushioning elements 26 to the pulley and quill 24 by lugs 20, 24, screws 27, and washers 28, serves the further, and decidedly important, function of axially supporting these parts in proper relation, also preventing end separation thereof. There is no need whatsoever for special stops, thrust elements or the like restrainingly engaging the parts, nor is there present undue wear between axially engaged rotatable and fixed parts, all of which features are objectionable not only because of the increased cost of material and assembly that they entail, but also because they must eventually be serviced or replaced. This is all eliminated in the present structure. It will be seen that splined quill or sleeve 22 is supported in axially spaced relation to the upper end of the tubular bearing support 9 and bearing 13, there being no seating of these parts one on the other to introduce friction and wear and detract from the proper operation of the pulley bearing, as is inevitable in a loose fit, friction seating construction. Whereas the aforesaid type of mechanical limiting arrangement for a plurality of loosely associated parts represents a substantial addition to the over-all axial dimension of the press, adding just so much to its bulkiness and cost, in the present case the functions of axially restraining and supporting the coacting pulley and sleeve driving parts are consolidated in the simple connection of these respective parts to the cushion, thereby greatly economizing in materials and dimension. In a press primarily intended as an inexpensive item, all such factors must be considered. The improved assembly of an elastic torque joint associated with the pulley and splined spindle driving quill is ideally adapted for a low-cost machine tool of the type under consideration.

The parts are capable of prolonged silent operation without attention and are readily assembled by unskilled persons. In this operation, the splined quill 24 is first associated with and locked to cushion element 26, after which the thus associated parts are engaged in the pulley recess and locked to the lugs 20 of the pulley. Bearing 13, already assembled on the sleeve 9, is then slipped into place and the retaining ring applied. The screws for securing the cushion to the pulley lugs 20 are readily accessible from the lower end of the pulley recess, thereby constituting a highly practical construction from the standpoint of ease of assembly.

It will be noted that the splined driving connection to the spindle is located quite closely to the bearing for the spindle in the conventional sliding guide quill 3. This is the result equally of the telescoped relationship of the parts and the use of the lugs, cushion and screws to axially bind the pulley and member 22 together, and, in effect, floatingly support the latter above bearing 13 and sleeve 9. It substantially decreases the tendency of the spindles to whip and accordingly further diminishes vibration.

The foregoing advantages in point of vibration, noise and wear reduction, simplicity and economy of parts, ease of assembly and the like discussed at length above, constitute an ideal torque transmission for drill presses, particularly those of inexpensive construction. As a conservative estimate based on actual tests, the vibration and resultant noise and wear, are in the present construction decreased approximately 50%, compared to a standard press unequipped with the torque coupling described.

The terms and expressions which have been herein employed are used as terms of description and not of limitation, and there is no intention in the use of such terms and expressions of excluding any equivalents of the features shown and described. It is recognized that various modifications are possible within the scope of the invention claimed.

Having thus described my invention, what I claim as new and desire to secure by Letters Patent is:

1. In a drill press, in combination with a drill bearing head having a vertically reciprocal spindle rotatable therein, and a pulley surrounding said spindle at its upper end, said pulley having means associated therewith for rotatably mounting the same on said head, a sleeve-like spindle driving member splined on said spindle at the upper end thereof, said pulley having an axial recess telescopingly receiving said member with radial clearance to permit misalignment of said pulley and member and being apertured coaxially with said recess for the slidable reception of the spindle, driving lugs on said pulley and member disposed internally of said recess, the respective lugs of said pulley and member extending parallel to the axis of the pulley in opposite directions and axially overlapping one another, and a cushion element of elastic compressible material snugly receivable in said pulley recess in surrounding relation to said spindle, said element being fixedly secured to and drivingly engaging said lugs for the elastic transmission of torque between the pulley and member.

2. In a drill press, in combination with a drill bearing head having a vertically reciprocal spindle rotatable therein, and a pulley surrounding said spindle at its upper end, said pulley having means associated therewith for rotatably mounting the same on said head, a sleeve-like spindle driving member splined on said spindle at the upper end thereof and out of radial contact with said pulley, said pulley being apertured for the slidable reception of the spindle, driving lugs on said pulley and member, the respective lugs of said pulley and member extending parallel to the axis of the pulley in opposite directions and axially overlapping one another, and a cushion element of elastic compressible material in surrounding relation to said spindle, said element being fixedly secured to and drivingly engaging said lugs for the elastic transmission of torque between the pulley and member.

3. In a drill press, in combination with a drill bearing head having a vertically reciprocal spindle rotatable therein, a pulley means for rotatably mounting the pulley on said head, a spindle driving member splined on said spindle at the upper end thereof, said pulley having a recess telescopingly receiving said member with radial clearance to permit misalignment of said pulley and member and being apertured coaxially with said recess for the slidable reception of the spindle, driving lugs on said pulley and member disposed internally of said recess and adjacent to the top of said member, said respective lugs extending in opposite directions parallel to the axis of the pulley and axially overlapping one another, and a cushion element of elastic compressible material in said pulley recess in surrounding relation to said spindle, said element drivingly engaging said lugs for the elastic transmission of torque from the pulley to the spindle and being fixedly secured to said pulley and spindle driving member, whereby to axially support and restrain said driving member through the connection of said cushion element thereto.

4. In a drill press, in combination with a drill bearing head having a vertically reciprocal spindle rotatable therein, a pulley means for rotatably mounting the pulley on said head, a spindle driving member splined on said spindle at the upper end thereof and out of radial contact with said pulley, driving lugs on said pulley and member, said respective lugs extending in opposite directions parallel to the axis of the pulley and axially overlapping one another, and a cushion element of elastic compressible material in surrounding relation to said spindle, said element drivingly engaging said lugs for the elastic transmission of torque from the pulley to the spindle and being fixedly secured to said pulley and spindle driving member, whereby to axially support and restrain said driving member through the connection of said cushion element thereto.

5. In a drill press, in combination with a drill bearing head having a vertically reciprocal spindle rotatable therein, a pulley means for rotatably mounting the pulley on said head, a spindle driving member splined on said spindle at the upper end thereof, said pulley having a recess telescopingly receiving said member with radial clearance to permit misalignment of said pulley and member and being apertured coaxially with said recess for the slidable reception of the spindle, said pulley and member respectively having driving means disposed internally of said recess and adjacent to the top of said members, and a cushion element of elastic compressible material in said pulley recess in surrounding relation to said spindle, said element drivingly engaging said respective driving means of the pulley and member for the elastic transmission of torque from the pulley to the spindle and being fixedly secured to said pulley and spindle driving member whereby to axially support and restrain said driving member through the connection of said cushion element thereto.

6. In a drill press, in combination with a drill bearing head having a vertically reciprocal spindle rotatable therein, a pulley means for rotatably mounting the pulley on said head, a spindle driving member splined on said spindle at the upper end thereof and out of radial contact with said pulley, said pulley and member respectively having driving means, and a cushion element of elastic compressible material in surrounding relation to said spindle, said element drivingly engaging said respective driving means of the pulley and member for the elastic transmission of torque from the pulley to the spindle and being fixedly secured to said pulley and spindle driving member whereby to axially support and restrain said driving member through the connection of said cushion element thereto.

7. In a drill press, in combination with a drill bearing head having a reciprocal spindle rotatable therein, a pulley having means associated therewith for rotatably mounting the same on said head, a spindle driving member splined on said spindle, said pulley having a recess telescopingly receiving said member with radial clearance to permit misalignment of said pulley and member, and means including an elastic cushioning element in said recess drivingly coacting with said member and pulley for the flexible transmission of torque therebetween, said means being secured to said member and pulley in axial supporting and displacement resistant relation thereto, whereby to obviate the need for axial seating means for the member or further means to resist end separating movement of the spindle driving member and pulley.

8. In a drill press, in combination with a drill bearing head having a reciprocal spindle rotatable therein, a pulley having means associated therewith for rotatably mounting the same on said head, a spindle driving member splined on said spindle and out of radial contact with said pulley, and means including an elastic cushioning element drivingly coacting with said member and pulley for the flexible transmission of torque therebetween, said means being secured to said member and pulley in axial supporting and displacement resistant relation thereto, whereby to obviate the need for axial seating means for the member or further means to resist end separating movement of the spindle driving member and pulley.

9. In a drill press having a head, a tool spindle vertically reciprocal therein and a driving pulley, said head having a sleeve-like bearing member secured thereto and said pulley being rotatably mounted on said member, a driving torque connection from said pulley to said spindle including an axially elongated spindle driving element splined on said spindle adjacent the upper end thereof and telescopingly receivable in said bearing member with substantial lateral clearance, driving and driven lugs secured to said pulley and element respectively, said pulley having an internal downwardly disposed recess for the internal axial reception of said spindle driving element, the lugs secured to the pulley being disposed in said recess to depend downwardly therein and those on said element projecting upwardly from the upper end thereof axially overlapping and angularly alternating with the pulley lugs, and a cushion of elastic compressible material apertured centrally to surround the splined portion of the spindle with substantial lateral clearance, said cushion element being conformed for snug reception in said pulley recess and being provided with openings parallel to the axis thereof for the driving reception of said driving and driven lugs, said lugs having members coacting therewith and laterally overlapping the material of the cushion to bind the latter to the pulley and element respectively thereby drivingly connecting said pulley to said spindle driving element and maintaining the same together as a unit resistant to axial separation or displacement of the parts, said pulley axially sustaining and supporting said element through said cushion connection thereto, said cushion centering said pulley relative to the driving element and spindle and compensating for belt pull on the pulley and the vibration normally existant in the pulley.

10. In a drill press having a head, a tool spindle vertically reciprocal therein and a driving pulley, said head having a bearing member thereon and said pulley being rotatably mounted on said member, a driving torque connection from said pulley to said spindle including a spindle driving element splined on said spindle adjacent the upper end thereof, driving and driven lugs secured to said pulley and element respectively, the lugs secured to the pulley axially overlapping and angularly alternating with the element lugs, and a cushion of elastic compressible material apertured centrally to surround the splined portion of the spindle, said cushion element being provided with openings parallel to the axis thereof for the driving reception of said driving and driven lugs, said lugs having members coacting therewith and laterally overlapping the material of the cushion to bind the latter to the pulley and element respectively, thereby drivingly connecting said pulley to said spindle driving element and maintaining the same together as a unit resistant to axial separation or displacement of the parts, said pulley axially sustaining and supporting said element through said cushion connection thereto.

11. In a drill press having a head, a tool spindle vertically reciprocal therein and a driving pulley, said head having a bearing member thereon and said pulley being rotatably mounted on said member, a driving torque connection from said pulley to said spindle, including a spindle driving element splined on said spindle adjacent the upper end thereof, driving and driven lugs secured to said pulley and element respectively, the lugs secured to the pulley axially overlapping and angularly alternating with the element lugs, and a cushion of elastic compressible material apertured centrally to surround the splined portion of the spindle, said cushion element being provided with openings parallel to the axis thereof for the driving reception of said driving and driven lugs, and means to bind the material of the cushion to the pulley and element respectively, thereby drivingly connecting said pulley to said spindle driving element and maintaining the same together as a unit resistant to axial separation or displacement of the parts, said pulley axially sustaining and supporting said element through said cushion connection thereto.

12. In a drill press in combination with a drill bearing head having a vertically reciprocal spindle rotatable therein, and a pulley surrounding said spindle at its upper end, said pulley having means associated therewith for rotatably mounting the same on said head, a sleeve-like spindle driving member splined on said spindle, said pulley having a recess telescopingly receiving said member and being apertured coaxially with said recess for the slidable reception of the spindle, driving lugs on said pulley and on the upper end of said member disposed internally of said recess, the respective lugs of said pulley and member extending parallel to the axis of the pulley in opposite directions and axially overlapping one another, a cushion element of elastic compressible material in said pulley recess in surrounding relation to said spindle, said element being fixedly secured to and in driving engagement with the lugs on said member for the elastic transmission of torque between the pulley and member and there being screws in the ends of said lugs on said pulley and extending axially thereof to hold said cushion element, the heads of said screws being readily accessible from the open end of said recess.

13. In a drill press in combination with a drill bearing head having a vertically reciprocal spindle rotatable therein, and a pulley surrounding said spindle at its upper end, said pulley having means associated therewith for rotatably mounting the same on said head, a sleeve-like spindle driving member splined on said spindle, said pulley having a recess telescopingly receiving said member, driving lugs on said pulley and on the upper end of said member disposed internally of said recess, the respective lugs of said pulley and member extending parallel to the axis of the pulley in opposite directions and axially overlapping one another, a cushion element of elastic compressible material in said pulley recess in surrounding relation to said spindle, said element being fixedly secured to and in driving engagement with the lugs on said member for the elastic transmission of torque between the pulley and member and means for holding said cushion element in engagement with said lugs, said means being readily accessible from the open end of said recess.

14. In a drill press in combination with a drill bearing head having a vertically reciprocal spindle rotatable therein, and a pulley surrounding said spindle at its upper end, said pulley having means associated therewith for rotatably mounting the same on said head, a sleeve-like spindle driving member splined on said spindle, said pulley having a recess telescopingly receiving said member, a cushion element of elastic compressible material in said pulley recess in surrounding relation to said spindle, said element being fixedly secured to and in driving engagement with said pulley and member for the elastic transmission of torque therebetween, and means for holding said cushion element in engagement with said pulley and member, said means being readily accessible from the open end of said recess.

HENRY E. MUSSELMAN.